US011685049B2

(12) United States Patent
Klingensmith

(10) Patent No.: US 11,685,049 B2
(45) Date of Patent: Jun. 27, 2023

(54) ROBOT LOCALIZATION USING VARIANCE SAMPLING

(71) Applicant: Boston Dynamics, Inc., Waltham, MA (US)

(72) Inventor: Matthew Jacob Klingensmith, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 495 days.

(21) Appl. No.: 16/893,608

(22) Filed: Jun. 5, 2020

(65) Prior Publication Data
US 2021/0331313 A1 Oct. 28, 2021

Related U.S. Application Data

(60) Provisional application No. 63/013,634, filed on Apr. 22, 2020.

(51) Int. Cl.
B25J 9/16 (2006.01)
B25J 13/00 (2006.01)

(52) U.S. Cl.
CPC .......... B25J 9/1664 (2013.01); B25J 13/006 (2013.01)

(58) Field of Classification Search
CPC ........ B25J 9/1664; B25J 13/006; B25J 11/00; B25J 13/089; G05D 1/0272;
(Continued)

(56) References Cited

U.S. PATENT DOCUMENTS 7,177,737 B2  2/2007  Karlsson et al.
7,774,158 B2  8/2010  Domingues Goncalves et al.
(Continued)

FOREIGN PATENT DOCUMENTS

DE  102018101388 A1  7/2019
WO  2019183727 A1  10/2019

OTHER PUBLICATIONS

International Search Report, Application No. PCT/US2021/025294, dated Jun. 14, 2021, 17 pages.
(Continued)

Primary Examiner — Robert T Nguyen
(74) Attorney, Agent, or Firm — Knobbe, Martens, Olson & Bear, LLP

(57) ABSTRACT

A method of localizing a robot includes receiving odometry information plotting locations of the robot and sensor data of the environment about the robot. The method also includes obtaining a series of odometry information members, each including a respective odometry measurement at a respective time. The method also includes obtaining a series of sensor data members, each including a respective sensor measurement at the respective time. The method also includes, for each sensor data member of the series of sensor data members, (i) determining a localization of the robot at the respective time based on the respective sensor data, and (ii) determining an offset of the localization relative to the odometry measurement at the respective time. The method also includes determining whether a variance of the offsets determined for the localizations exceeds a threshold variance. When the variance among the offsets exceeds the threshold variance, a signal is generated.

24 Claims, 11 Drawing Sheets

(58) Field of Classification Search
CPC ........ G05D 2201/0217; G01C 21/1652; G01C 21/1656; G01C 22/00
See application file for complete search history.

(56) References Cited

U.S. PATENT DOCUMENTS

| | | | |
|---|---|---|---|
| 8,020,657 B2 | 9/2011 | Allard et al. | |
| 8,577,517 B2 | 11/2013 | Phillips et al. | |
| 8,873,831 B2 | 10/2014 | Ahn et al. | |
| 9,020,637 B2 | 4/2015 | Schnittman | |
| 9,037,396 B2* | 5/2015 | Pack | G01C 21/20 701/409 |
| 9,250,078 B2 | 2/2016 | Kaiser et al. | |
| 9,329,598 B2 | 5/2016 | Pack et al. | |
| 9,360,300 B2 | 6/2016 | DiBernado et al. | |
| 9,519,289 B2 | 12/2016 | Munich et al. | |
| 9,630,319 B2 | 4/2017 | Vicenti | |
| 9,744,670 B2 | 8/2017 | Romanov et al. | |
| 9,751,210 B2 | 9/2017 | Fong et al. | |
| 9,870,624 B1 | 1/2018 | Narang et al. | |
| 9,902,069 B2 | 2/2018 | Farlow et al. | |
| 9,969,089 B2 | 5/2018 | Goel et al. | |
| RE47,108 E | 10/2018 | Jacobus et al. | |
| 10,096,129 B2 | 10/2018 | Narang et al. | |
| 10,353,399 B2 | 7/2019 | Afrouzi | |
| 10,386,850 B2 | 8/2019 | Heinla et al. | |
| 10,391,630 B2 | 8/2019 | Fong et al. | |
| 10,611,023 B2 | 4/2020 | Fong et al. | |
| 2010/0076599 A1 | 3/2010 | Jacobs et al. | |
| 2013/0138247 A1* | 5/2013 | Gutmann | G01S 17/06 901/1 |
| 2019/0110652 A1 | 4/2019 | Moroniti et al. | |
| 2021/0365029 A1* | 11/2021 | Molina Cabrera | A47L 11/4061 |
| 2022/0026920 A1* | 1/2022 | Ebrahimi Afrouzi | G06N 3/084 |
| 2022/0187841 A1* | 6/2022 | Ebrahimi Afrouzi | G05D 1/0242 |

OTHER PUBLICATIONS

Winkler et al., "Path planning with force-based foothold adaptation and virtual model control for torque controlled quadruped robots," May 31, 2014, 7 pages.

* cited by examiner

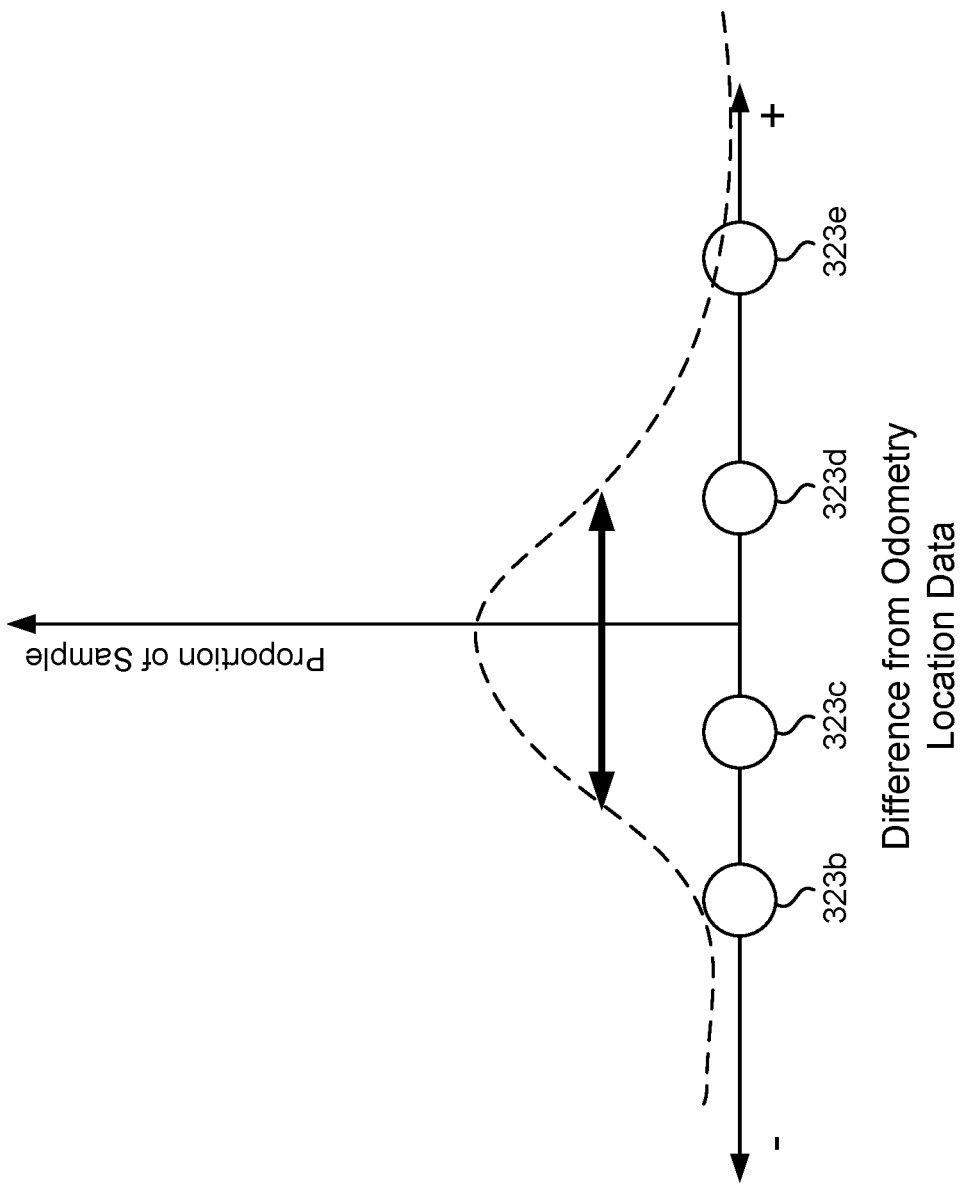

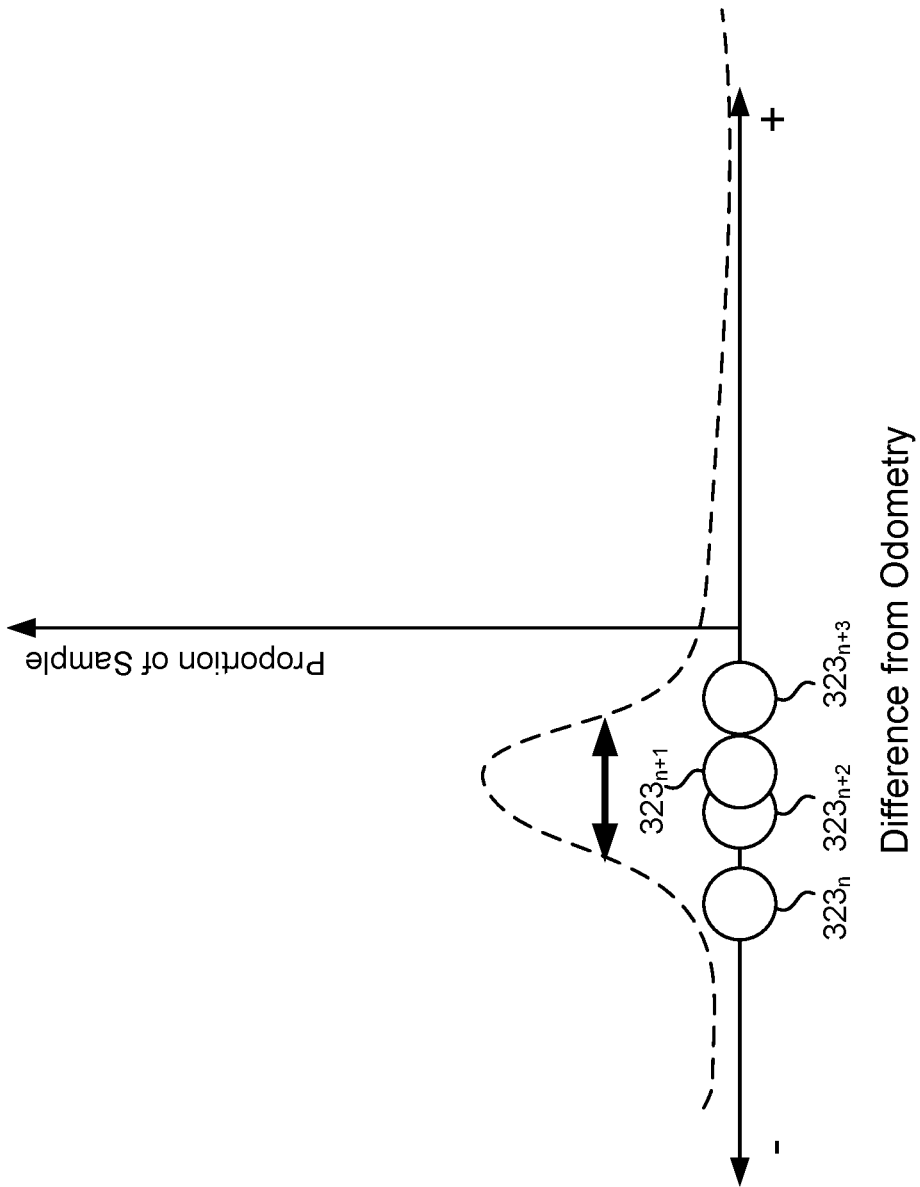

ROBOT LOCALIZATION USING VARIANCE SAMPLING

CROSS REFERENCE TO RELATED APPLICATIONS

This U.S. patent application claims priority under 35 U.S.C. § 119(e) to U.S. Provisional Application 63/013,634, filed on Apr. 22, 2020. The disclosure of this prior application is considered part of the disclosure of this application and is hereby incorporated by reference in its entirety.

TECHNICAL FIELD

This disclosure relates robot localization using variance sampling for robots.

BACKGROUND

A robot is generally defined as a programmable and multifunctional system designed to navigate an environment and/or to move material, parts, tools, or specialized devices through variable programmed motions for a performance of tasks. Robots may be mobile robots that move throughout an environment (e.g., using legs, wheels, or traction based mechanisms), manipulators that are physically anchored (e.g., industrial robotic arms), or some combination of a manipulator and a mobile robot. Robots are utilized in a variety of industries including, for example, manufacturing, transportation, hazardous environments, exploration, and healthcare. As such, the ability of robots to accurately determine location within the robot environment provides additional benefits to such industries.

DESCRIPTION OF DRAWINGS

FIGS. 7A and 7B are plots showing example distributions of values of the offsets relative to the corresponding odometry location information.

Like reference symbols in the various drawings indicate like elements.

DETAILED DESCRIPTION

Figure 1:
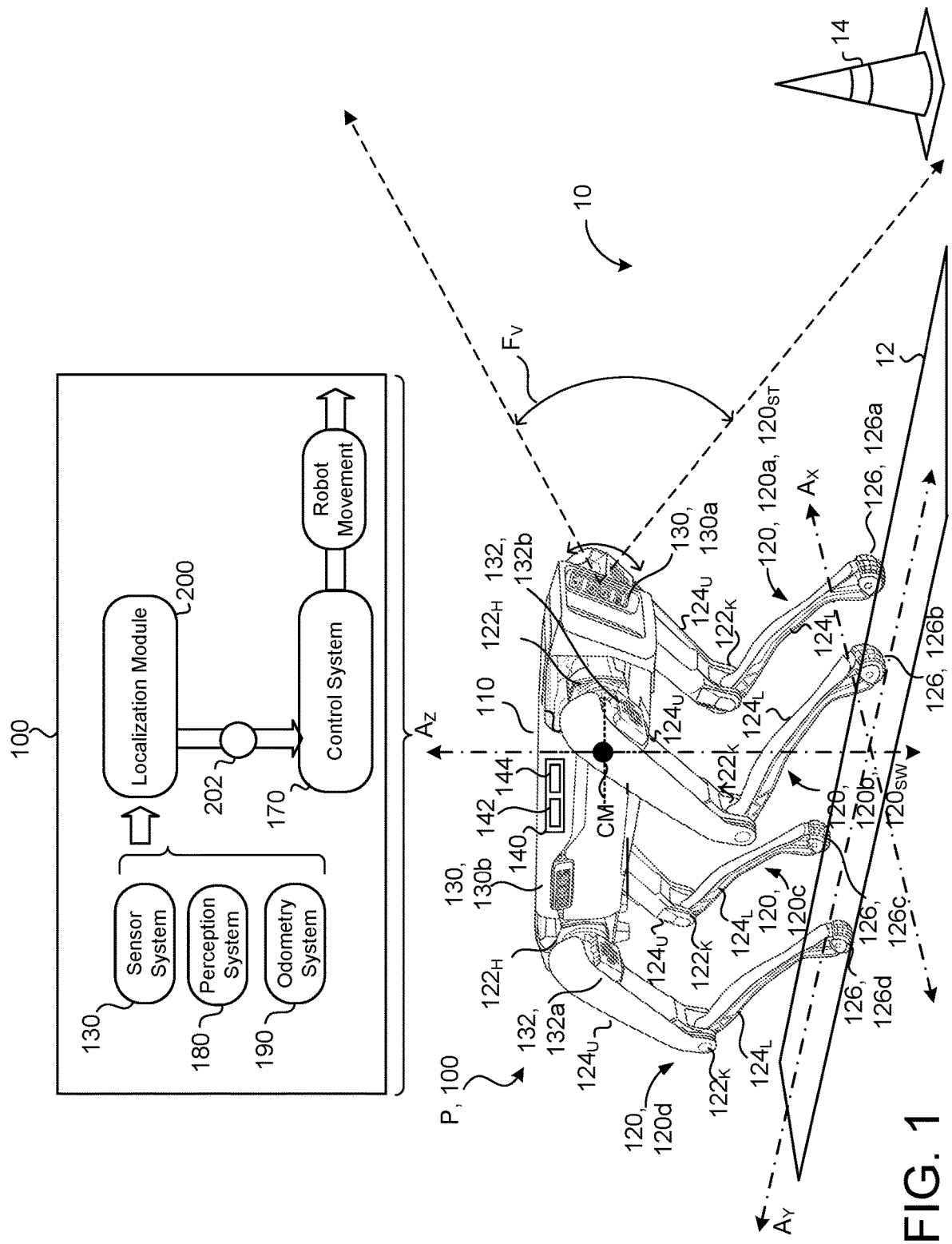
FIG. 1 is a schematic view of an example robot within an environment.

Mobile robots are typically programmed to navigate an environment by manually driving the robot around an environment and building a map of the environment using sensor systems of the robot. Based on the map, the robot must be capable of autonomously navigating the environment to achieve certain tasks (such as taking additional sensor measurements, or manipulating objects). During navigation, the robot my continuously conduct a localization operation to determine the actual (i.e. local) position of the robot within the environment.

Autonomous robots navigating and localizing in real environments using camera or laser sensors face many challenges—sensor noise and drift, misleading or view-dependent features, and ambiguous geometry, etc. Accordingly, the robot must know whether to trust data received from the sensor systems a priori. If a robot does not know what sensor data to trust, the robot can become lost or confused by the misleading data. Misleading data from the sensor system is predominantly caused by environmental conditions (such as the shininess of surrounding surfaces, the distance to walls, the presence or absence of strong textures or reference objects in the environment, etc.) rather than properties intrinsic to the sensor itself. Environmental conditions that lead to misleading sensor data may be referred to as "feature deserts," as the environment lacks sufficient reference features for the sensor system to rely upon in determining the location of the robot.

Traditional approaches to determining whether sensor data is reliable have relied on modelling sensor properties directly, and applying this forward model to live sensor data to determine whether the data can be trusted. However, not all sensor error can be efficiently modeled. Other approaches consider learning the sensor model, but these approaches rely on extensive training data and are not easy to inspect.

The present disclosure provides a system and process for a robot to determine when the sensor data associated with the surrounding environment is reliable, and therefore, can be trusted by the robot for navigating and performing localization in the environment. In particular, implementations herein are directed toward executing a process for determining sensor data reliability online (e.g., while the robot is making a map of its environment) to permit the robot to provide a user feedback indicating the quality of the sensor data so that the user can take immediate corrective action (if necessary). For example, responsive to user feedback indicating that the quality of the sensor data is poor, the user may move the robot closer to walls and/or add additional reference features in the environment when building the map of the environment. As will become apparent, the techniques disclosed in the present disclosure eliminate or reduce the need for an expensive offline system for analyzing sensor data quality, which analyzes robot sensor data after-the-fact to make a prediction about the quality of the sensor data and the presence of feature deserts.

Referring to FIG. 1, the robot 100 includes a body 110 with locomotion based structures such as legs 120*a-d* coupled to the body 110 that enable the robot 100 to move about an environment 10. In some examples, each leg 120 is an articulable structure such that one or more joints 122 permit members 124 of the leg 120 to move. For instance, each leg 120 includes a hip joint $122_H$ coupling an upper member $124_U$ of the leg 120 to the body 110 and a knee joint $122_K$ coupling the upper member $124_U$ of the leg 120 to a lower member $124_L$ of the leg 120. Although FIG. 1 depicts a quadruped robot with four legs 120*a-d*, the robot 100 may include any number of legs or locomotive based structures (e.g., a biped or humanoid robot with two legs) that provide a means to traverse the terrain within the environment 10.

In order to traverse the terrain, each leg 120 has a distal end 126 (also referred to as a foot 126 of the robot 100) that contacts a surface of the terrain (i.e., a traction surface). In other words, the distal end 126 of the leg 120 is the end of the leg 120 used by the robot 100 to pivot, plant, or generally provide traction during movement of the robot 100. For example, the distal end 126 of a leg 120 corresponds to a foot of the robot 100. In some examples, though not shown, the distal end 126 of the leg 120 includes an ankle joint $122_A$ such that the distal end 126 is articulable with respect to the lower member $124_L$ of the leg 120.

The robot 100 has a vertical gravitational axis (e.g., shown as a Z-direction axis $A_Z$) along a direction of gravity, and a center of mass CM, which is a point where the weighted relative position of the distributed mass of the robot 100 sums to zero. The robot 100 further has a pose P based on the center of mass CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. A ground plane (also referred to as a transverse plane) spans the X-Y plane by extending in directions of the x-direction axis $A_X$ and the y-direction axis $A_Y$. The ground plane refers to a ground surface 12 where distal ends 126 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_z$.

When a legged-robot 100 moves about the environment 10, the legs 120 of the robot undergo a gait cycle. Generally, a gait cycle begins when a leg 120 touches down or contacts a ground surface 12 and ends when that same leg 120 once again contacts the ground surface 12. The gait cycle may predominantly be divided into two phases, a swing phase and a stance phase. During the swing phase, a leg 120 performs (i) lift-off from the ground surface 12 (also sometimes referred to as toe-off and the transition between the stance phase and swing phase), (ii) flexion at a knee joint $122_K$ of the leg 120, (iii) extension of the knee joint $122_K$ of the leg 120, and (iv) touchdown back to the ground surface 12. Here, a leg 120 in the swing phase is referred to as a swing leg $120_{SW}$. As the swing leg $120_{SW}$ proceeds through the movement of the swing phase $120_{SW}$, one or more of the other legs 120 performs the stance phase. The stance phase refers to a period of time where a distal end 126 (e.g., a foot) of the leg 120 is on the ground surface 12. During the stance phase a leg 120 performs (i) initial ground surface contact which triggers a transition from the swing phase to the stance phase, (ii) loading response where the leg 120 dampens ground surface contact, (iii) mid-stance support for when the contralateral leg (i.e., the swing leg $120_{SW}$) lifts-off and swings to a balanced position (about halfway through the swing phase), and (iv) terminal-stance support from when the robot's center of mass CM is over the leg 120 until the contralateral leg 120 touches down to the ground surface 12. Here, a leg 120 in the stance phase is referred to as a stance leg $120_{ST}$.

In order to maneuver about the environment 10, the robot 100 includes a sensor system 130, 130a-b with one or more sensors 132, 132a-n (e.g., shown as a first sensor 132, 132a and a second sensor 132, 132b). The sensors 132 may include vision/image sensors 132, inertial sensors (e.g., an inertial measurement unit (IMU)), force sensors, and/or kinematic sensors. Some examples of image sensors 132 include a camera such as a stereo camera, a scanning light-detection and ranging (LIDAR) sensor, or a scanning laser-detection and ranging (LADAR) sensor. In some examples, the image sensors 132 have a corresponding field(s) of view $F_V$ defining a sensing range or region corresponding to the image sensors 132i. For instance, FIG. 1 depicts a field of a view $F_V$ for the robot 100. Each image sensor 132 may be pivotable and/or rotatable such that the image sensor 132 may, for example, change the field of view $F_V$ about one or more axis (e.g., an x-axis, a y-axis, or a z-axis in relation to a ground plane).

In some implementations, the sensor system 130 includes position sensor(s) 132 coupled to a joint 122. In some examples, these position sensors 132 couple to a motor that operates a joint 122 of the robot 100 (e.g., sensors 132, 132a-b). Here, these sensors 132 generate joint dynamics 134, $134_{JD}$ in the form of joint-based sensor data 134. Joint dynamics $134_{JD}$ collected as joint-based sensor data 134 may include joint angles (e.g., an upper member $124_U$ relative to a lower member $124_L$), joint speed (e.g., joint angular velocity or joint angular acceleration), and/or joint torques experienced at a joint 122 (also referred to as joint forces). Here, joint-based sensor data 134 generated by one or more sensors 132 may be raw sensor data, data that is further processed to form different types of joint dynamics $134_{JD}$, or some combination of both. For instance, a sensor 132 measures joint position (or a position of member(s) 124 coupled at a joint 122) and systems of the robot 100 perform further processing to derive velocity and/or acceleration from the positional data. In other examples, a sensor 132 is configured to measure velocity and/or acceleration directly.

When surveying a field of view $F_V$ with a sensor 132, the sensor system 130 generates sensor data 134 (also referred to as image data) corresponding to the field of view $F_V$. In some examples, the sensor data 134 is image data 134 that corresponds to a three-dimensional volumetric point cloud generated by a three-dimensional volumetric image sensor 132. The image data 134 may be based on reference features 14 situated within the environment 10 that can be easily distinguished and observed by the sensors 132. Additionally or alternatively, when the robot 100 is maneuvering about the environment 10, the sensor system 130 gathers pose data for the robot 100 that includes inertial measurement data 134 (e.g., measured by an IMU). In some examples, the pose data includes kinematic data and/or orientation data about the robot 100, for instance, kinematic data and/or orientation data about joints 122 or other portions of a leg 120 of the robot 100. With the image data 134 and the inertial measurement data 134, a perception system 180 of the robot 100 may generate maps 182 for the terrain about the environment 10.

While the robot 100 maneuvers about the environment 10, the sensor system 130 gathers sensor data 134 relating to the terrain of the environment 10 and/or structure of the robot 100 (e.g., joint dynamics and/or odometry of the robot 100). For instance, FIG. 1 depicts the sensor system 130 gathering sensor data 134 about a room of the environment 10 of the robot 100. As the sensor system 130 gathers sensor data 134, a computing system 140 is configured to store, process, and/or communicate the sensor data 134 to various systems of the robot 100 (e.g., a control system 170, the perception system 180, an odometry system 190, and/or a localization module 200). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Figure 2:
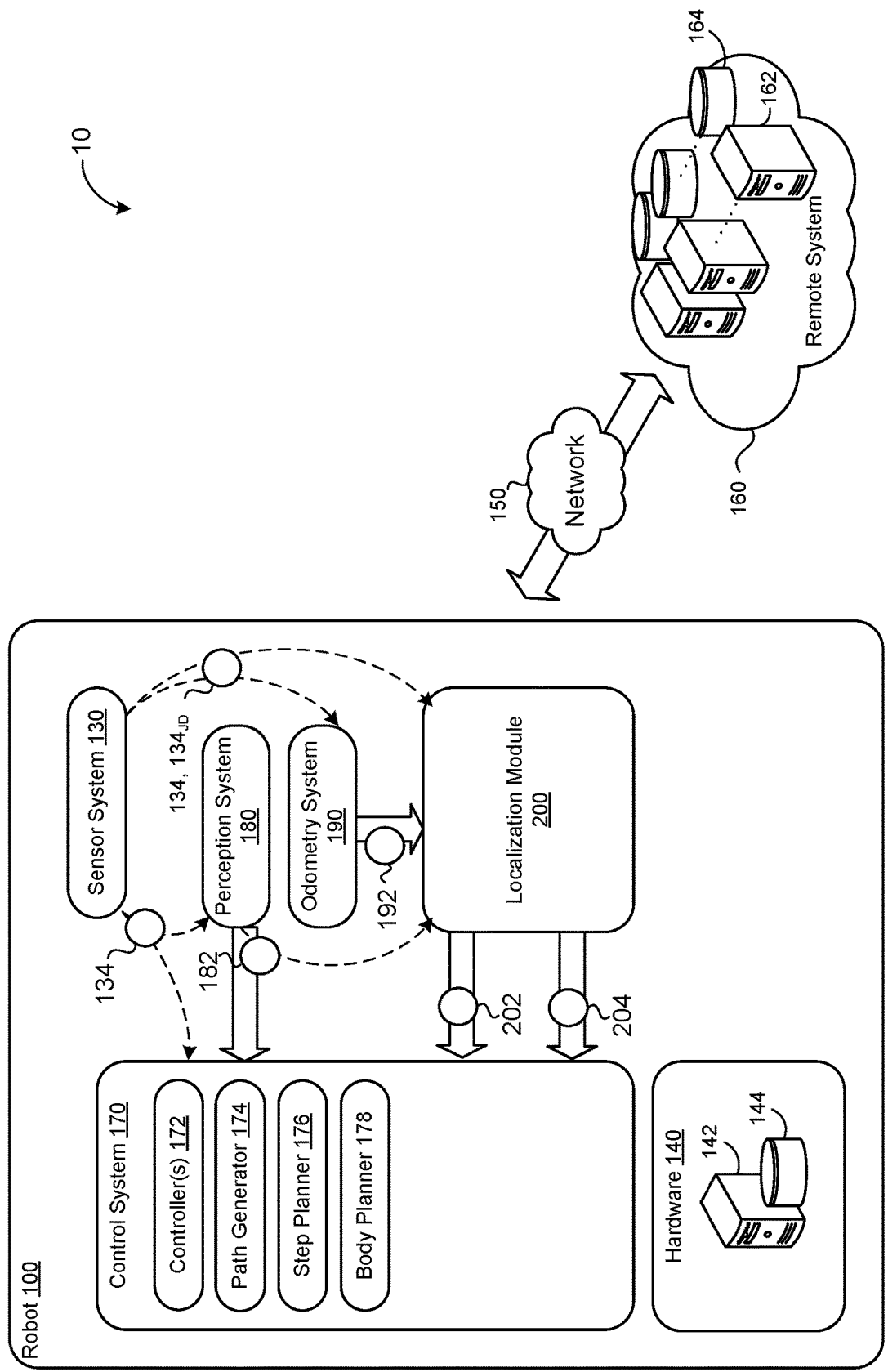
FIG. 2 is a schematic view of example systems for the robot of FIG. 1.
Figure 3:
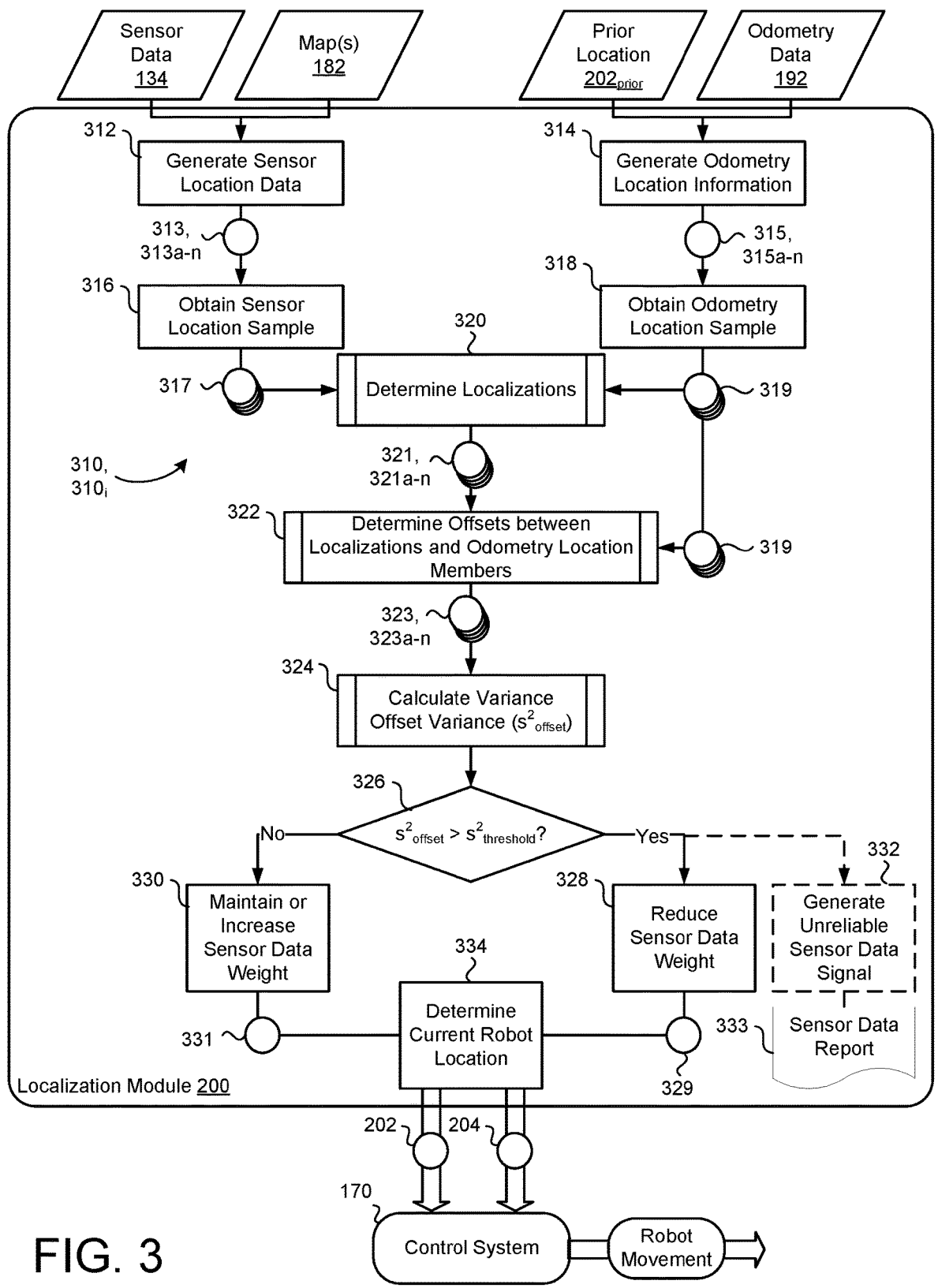
FIG. 3 is a schematic view of a localization module and an example arrangement of operations executed by the localization module for determining a location of a robot.

Additionally or alternatively, the computing system 140 includes computing resources that are located remotely from the robot 100. For instance, as shown in FIG. 2, the computing system 140 may communicate via a network 150 with a remote system 160 (e.g., a remote computer/server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In some examples, the computing system 140 is configured to utilize the remote resources 162, 164 as extensions of the computing resources 142, 144 such that resources of the computing system 140 may reside on resources of the remote system 160.

In some implementations, as shown in FIGS. 1 and 2, the robot 100 includes the control system 170 and the perception system 180. The perception system 180 is configured to receive the sensor data 134 from the sensor system 130 and process the sensor data 134 to generate maps 182. With the maps 182 generated by the perception system 180, the perception system 180 may communicate the maps 182 to the control system 170 in order perform controlled actions for the robot 100, such as moving the robot 100 about the environment 10. In some examples, by having the perception system 180 separate from, yet in communication with the control system 170, the control system 170 focuses on controlling the robot 100 while the perception system 180 separately focuses on interpreting the sensor data 134 gathered by the sensor system 130. For instance, these systems 170, 180 execute their processing in parallel to ensure accurate, fluid movement of the robot 100 in an environment 10.

In some examples, the control system 170 includes at least one controller 172, a path generator 174, a step planner 176, and a body planner 178. The control system 170 may be configured to communicate with at least one sensor system 130 and any other system of the robot 100 (e.g., the perception system 180, the odometry system 190, and/or the localization module 200). The control system 170 performs operations and other functions using hardware 140. The controller 172 is configured to control movement of the robot 100 to traverse about the environment 10 based on input or feedback from the systems of the robot 100 (e.g., the control system 170, the perception system 180, the odometry system 190, and/or the localization module 200). This may include movement between poses and/or behaviors of the robot 100. For example, the controller 172 controls different footstep patterns, leg patterns, body movement patterns, or vision system sensing patterns.

In some examples, the controller 172 includes a plurality of controllers 172 where each of the controllers 172 has a fixed cadence. A fixed cadence refers to a fixed timing for a step or swing phase of a leg 120. For example, each controller 172 instructs the robot 100 to move the legs 120 (e.g., take a step) at a particular frequency (e.g., step every 250 milliseconds, 350 milliseconds, etc.). With a plurality of controllers 172 where each controller 172 has a fixed cadence, the robot 100 can experience variable timing by switching between controllers 172. In some implementations, the robot 100 continuously switches/selects fixed cadence controllers 172 (e.g., re-selects a controller 172 every 3 milliseconds) as the robot 100 traverses the environment 10.

Referring to FIG. 2, the path generator 174 is configured to determine horizontal motion for the robot 100. For instance, the horizontal motion refers to translation (i.e., movement in the X-Y plane) and/or yaw (i.e., rotation about the Z-direction axis $A_Z$) of the robot 100. The path generator 174 determines obstacles within the environment 10 about the robot 100 based on the sensor data 134. The path generator 174 communicates the obstacles to the step planner 176 such that the step planner 176 may identify foot placements for legs 120 of the robot 100 (e.g., locations to place the distal ends 126 of the legs 120 of the robot 100). The step planner 176 generates the foot placements (i.e., touchdown locations for the foot 126) for each step using inputs from the perceptions system 180 (e.g., map(s) 182) and the localization module 200. The body planner 178, much like the step planner 176, receives inputs from the perceptions system 180 (e.g., map(s) 182). Generally speaking, the body planner 178 is configured to adjust dynamics of the body 110 of the robot 100 (e.g., rotation, such as pitch or yaw and/or height of COM) to successfully move about the environment 10.

The perception system 180 of the robot 100 is configured to help the robot 100 move more precisely in a terrain with various obstacles. As the sensors 132 collect sensor data 134 for the space about the robot 100 (i.e., the robot's environment 10), the perception system 180 uses the sensor data 134 to form one or more maps 182 for the environment 10. Once the perception system 180 generates a map 182, the perception system 180 is also configured to add information to the map 182 (e.g., by projecting sensor data 134 on a preexisting map) and/or to remove information from the map 182.

Referring further to FIG. 2, the odometry system 190 is configured to measure where the robot 100 is located within a world reference frame (e.g., the environment 10) and how fast the robot 100 is moving in that world reference frame. In other words, the odometry system 190 generates odometry information 192 as one or more estimations (e.g., measurements) for a characteristic of the robot 100 relative to a world reference frame. In some examples, the odometry system 190 receives sensor data 134 from a sensor 132 such as an IMU (e.g., accelerometer(s) and/or gyro(s)). With the sensor data 134, the odometry system 190 may generate odometry information 192 based on an assumption that when a distal end 126 of a leg 120 is in contact with the ground surface 12 and not slipping, the distal end 126 is stationary. By combining this assumption with the sensor data 134, the odometry system 190 generates odometry information 192 regarding robot motion relative to the world reference frame (e.g., the environment 10). In other words, the odometry system 190 accounts for kinematics and inertial measurements to produce estimations about the robot 100 with respect to the world reference frame.

As shown in FIG. 2, the localization module 200 is configured to evaluate the sensor data 134, the map 182, and the odometry information 192 received from the systems (e.g., the sensor system 130, the perception system 180, the odometry system 190, and/or the localization module 200) to determine location data 202 indicating a current location of the robot 100 within the environment 10. For example, the control system 170 of the robot 100 may use the odometry information 192 (e.g., speed, direction) to estimate a current location of the robot 100 within the environment 10 based on movements of the robot 100 relative to the prior location data $202_{prior}$. However, the odometry information 192 may include noise associated with events (e.g., slips, obstructions) and drift (e.g., measurement error), which result in errors in the estimated current location data 202. Accordingly, the localization module 200 is configured to periodically correct the estimated location of the robot 100 based on the image data 134. Particularly, the localization module 200 compares image data 134 received from the sensor system 130 to the map 182 generated by the perception system 180 to determine the actual location of the robot 100 relative to the map 182. The localization module 200 then adjusts the current location data 202 (i.e., the odometry information 192) of the robot 100 based on the localization. The current location data 202 is used by the control system 170 and the odometry system 190 in planning future movements and estimated locations within the environment 10. However, in some situations, there may not be a map 182 associated with the environment 10 and/or the sensor data 134 may be of poor quality, which makes accurate localization more difficult.

As discussed in greater detail below, the localization module 200 of the present disclosure is configured to perform localization of the robot 100 when the sensor data 134 (e.g., image data 134) received from the sensors 132 is unreliable and without needing a pre-existing map 182. Particularly, the localization module 200 uses the image data 134 to obtain localization results and compares these localization results to the odometry information 192 to determine whether or not the image data 134 is reliable. More specifically, when the robot 100 travels a relatively short period (i.e., time or distance), the localization module 200 is configured to assume that the noise (e.g., drift) in the odometry information 192 within that relatively short period is negligible and that the odometry information 192 is reliable. Accordingly, when the localization module 200 determines that the localization results obtained from the image data 134 vary significantly from the odometry information 192 within this relatively short period, the localization module 200 provides greater weight to the odometry information 192 based on the assumption that the odometry information 192 is accurate and reliable. In some instances, the localization module 200 determines that the image data 134 is unreliable and cannot be used by the robot 100. Additionally, the localization module 200 may generate a notification 204 instructing an operator/user of the robot 100 that the area of the environment 10 associated with the unreliable image data 134, and therefore unreliable current location data 202 obtained therefrom, lacks sufficient reference features 14 for the sensor system 132 to measure.

Described with reference to FIGS. 4-7B, FIG. 3 shows an example process 310 executed by the localization module 200 for determining whether or not sensor data 134 is reliable as the robot 100 moves through the environment 10. The localization module 200 may execute the process 310 on-line while the robot 100 is traversing the environment 10 to build a map 182. As discussed previously, the localization module 200 iteratively updates the current location data 202 based on the sensor data 134 and the odometry information 192 provided by the sensor system 130 and the odometry system 190, respectively. While the localization module 200 typically gives the sensor data 134 greater weight than the odometry information 192 when determining the current location data 202, in some instances, the localization module 200 determines that the sensor data 134 is unreliable and reduces the weight given to the sensor data 134 when determining the current location of the robot 100.

At step 312, the localization process 310 receives sensor data 134 associated with an area or region of the environment 10. Particularly, the sensor data 134 may include vision data 134 measured by one or more of the image sensors 132. The localization process 310 may also receive one or more of the maps 182 from the perception system 180. Based on the image data 134, the process 310 determines sensor location data 313, 313a-n representing locations of the robot 100 within the environment 10. Particularly, the sensor location data 313 represents the locations of the robot 100 relative to one or more reference features 14 within the environment 10, which may be included in the map 182, if available. However, in some situations, the sensor data 134 received by the localization module 200 may be unreliable, and may result in inconsistent sensor location data 313. For example, in areas of the environment 10 where reference features 14 are sparsely populated (e.g., empty spaces, buildings), repetitive (e.g., lights, pillars), or ambiguous (e.g., partially obstructed, reflective, blurry), the localization module 200 may struggle to accurately identify suitable reference features 14 that can be evaluated to determine the location of the robot 100.

At step 314, the localization process 310 receives odometry information 192 associated with movements of the robot 100 within the environment. Optionally, the localization module 200 receives prior location data $202_{prior}$ of the robot 100. The prior location data $202_{prior}$ represents a last-known location of the robot 100 within the environment 10 based on a preceding iteration $310_{i-1}$ of the localization process 310. Using the odometry information 192, and optionally, the prior location data $202_{prior}$ (i.e., the last known position), the localization module 200 generates odometry location information 315, 315a-n representing estimated movements and/or locations of the robot 100 within the environment.

To generate the odometry location information 315, the localization module 200 evaluates the odometry information 192 to determine a change in location with respect to the prior location data $202_{prior}$ of the robot 100. For example, the odometry information 192 may specify that the robot 100 has moved at a known speed and/or distance along a known direction during a preceding time period. While the odometry information 192 may include some noise/error associated with unplanned events (e.g., slips, obstructions) and measurement errors (e.g., joint and sensor tolerances), the noise/error in the odometry information 192 will be negligible for short time periods and/or distances.

Figure 4:
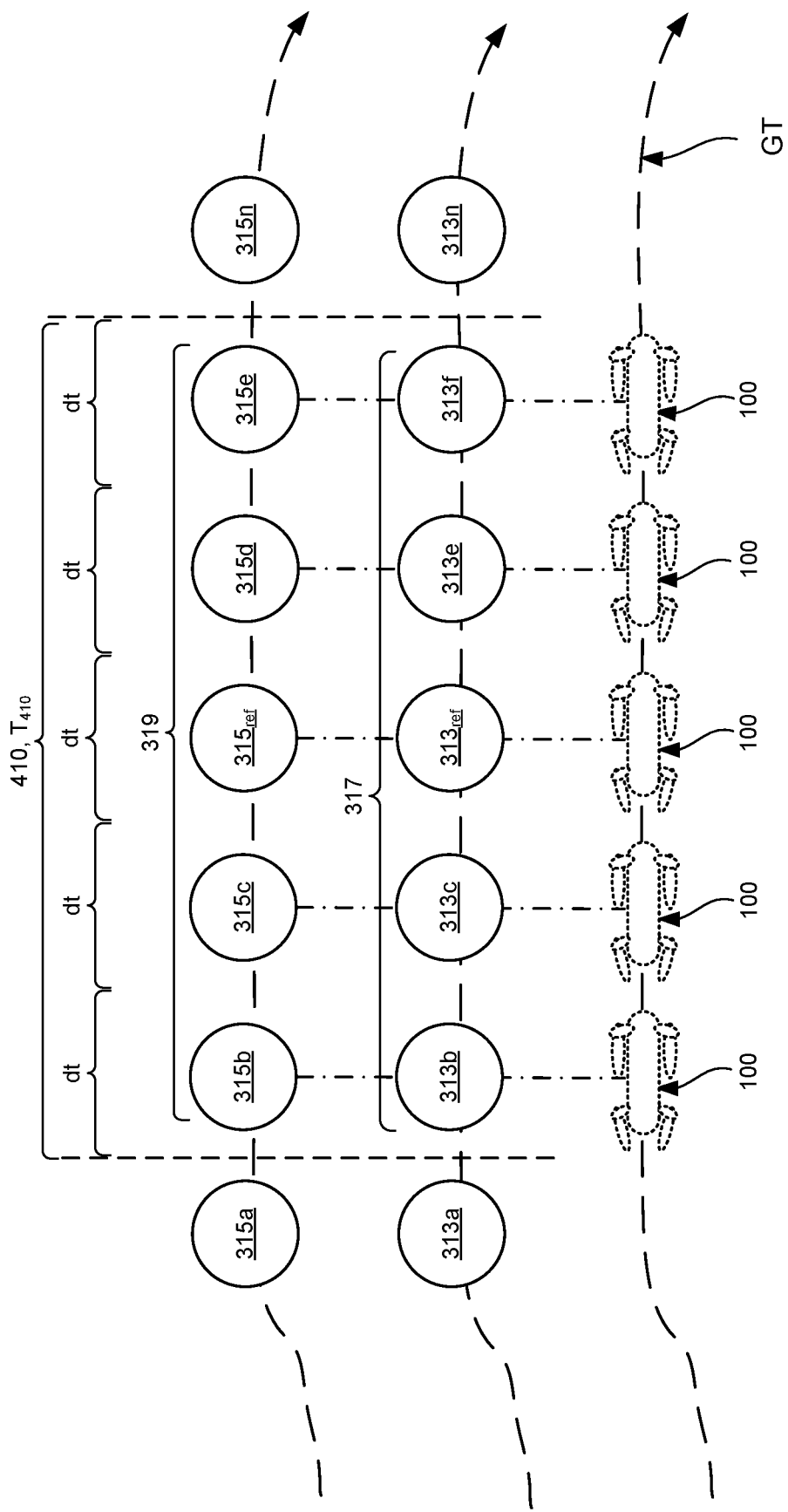
FIG. 4 is a plot showing sensor location data for a robot represented with respect to a period of time.

At step 316, the localization process 310 obtains a sample 317 of the sensor location data 313 including a plurality of sensor location data members $313_{ref}$, 313b-313e (FIG. 4) within a target sample basin 410 (FIG. 4). The sample basin 410 may be associated with a period of time, an estimated distance traveled, or a target size for the sensor location data sample 317. FIG. 4 shows a representation of the sensor location data sample 317 including a series of five subsequent sensor location data members $313_{ref}$, 313b-313e. For the sake of clarity, each sensor location data member $313_{ref}$, 313b-313e is associated with a respective delta time dt within a sample basin 410 corresponding to a sample time period $T_{410}$. As discussed in greater detail below, the sensor location data sample 317 includes a reference sensor location data member $313_{ref}$ and a plurality of comparison sensor location data members 313b-313e. Subsequent operations of the localization process 310 are performed on the comparison sensor location data members 313b-313e relative to the reference sensor location data member $315_{ref}$.

Referring back to FIG. 3, at step 318, the localization process 310 obtains a sample 319 of the odometry location information 315 including a plurality of odometry location information members $315_{ref}$, 315b-315e within the target sample basin 410. Each of the odometry location information members $315_{ref}$, 315b-315e corresponds in time dt to a respective one of the sensor location data members $313_{ref}$, 313b-313e. Accordingly, FIG. 4 shows the odometry location information sample 319 including a reference odometry location information member $315_{ref}$ and a plurality of comparison odometry location information members 315b-315e.

As described in greater detail below, the localization process 310 ultimately determines the reliability of the sensor data 134 based on the assumption that the comparison odometry location information members 315b-315e of the odometry location information sample 319 are accurate relative to the reference odometry location information member 315ref. Accordingly, the time period $T_{410}$ of the sample basin 410 may be tuned by an operator to balance the benefits of collecting a large sample size with the benefits of obtaining a reliable odometry location information sample 319. For instance, a smaller sample basin 410 may be selected to provide a pool of members 313n, 315n where the locations represented by the odometry location information members 315ref, 315b-315e are more likely to correspond the locations represented by the sensor location data members $313_{ref}$, 313b-313e. On the other hand, a larger sample basin 410 provides a larger pool of members 313n, 315n for determining variance (discussed below), but may result in a less accurate odometry location information sample 319 as noise within the odometry location information members 315a-315n accumulates over time.

At step 320, the localization process 310 determines a plurality of localizations 321, $321_{ref}$, 321b-321e based on the sensor location data sample 317 and the odometry location information sample 319. Particularly, the localization process 310 performs a pairwise analysis on each comparison sensor location data member 313b-313e with the reference sensor location data member $313_{ref}$ to determine how much the comparison sensor location data members 313b-313e agree with the reference sensor location data member $313_{ref}$. In some examples, a localization algorithm includes a six-degree-of-freedom (e.g., 3 translation axes, and 3 rotation axes) pairwise rigid transform from each comparison sensor location data member 313b-313e to the reference sensor position data member $313_{ref}$ based on the assumption that the environment 10 is static and the robot 100 is moving.

Figure 5A:
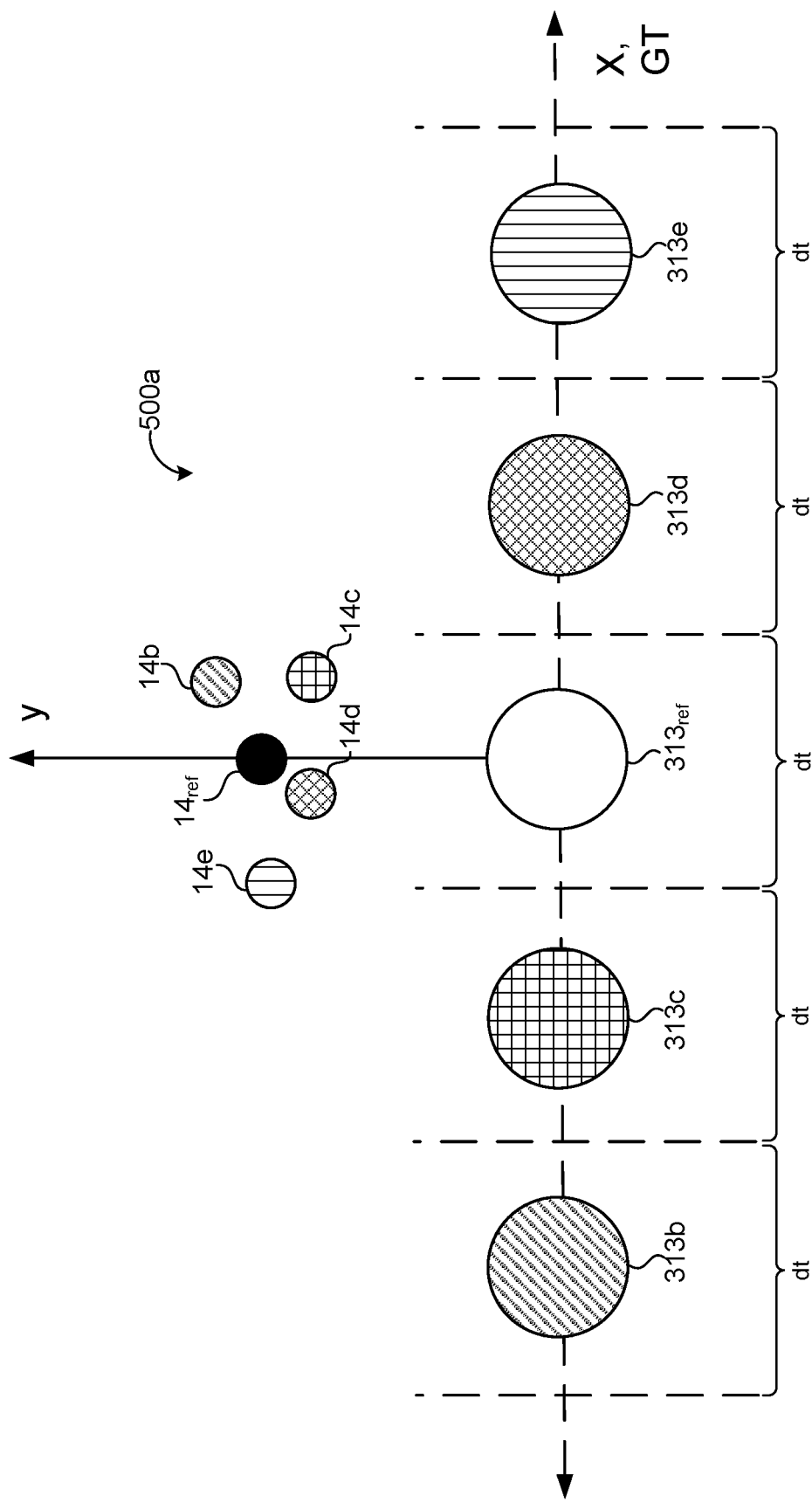
FIG. 5A is a plot showing the sensor location data of FIG. 4 represented with respect to a ground truth trajectory.
Figure 5B:
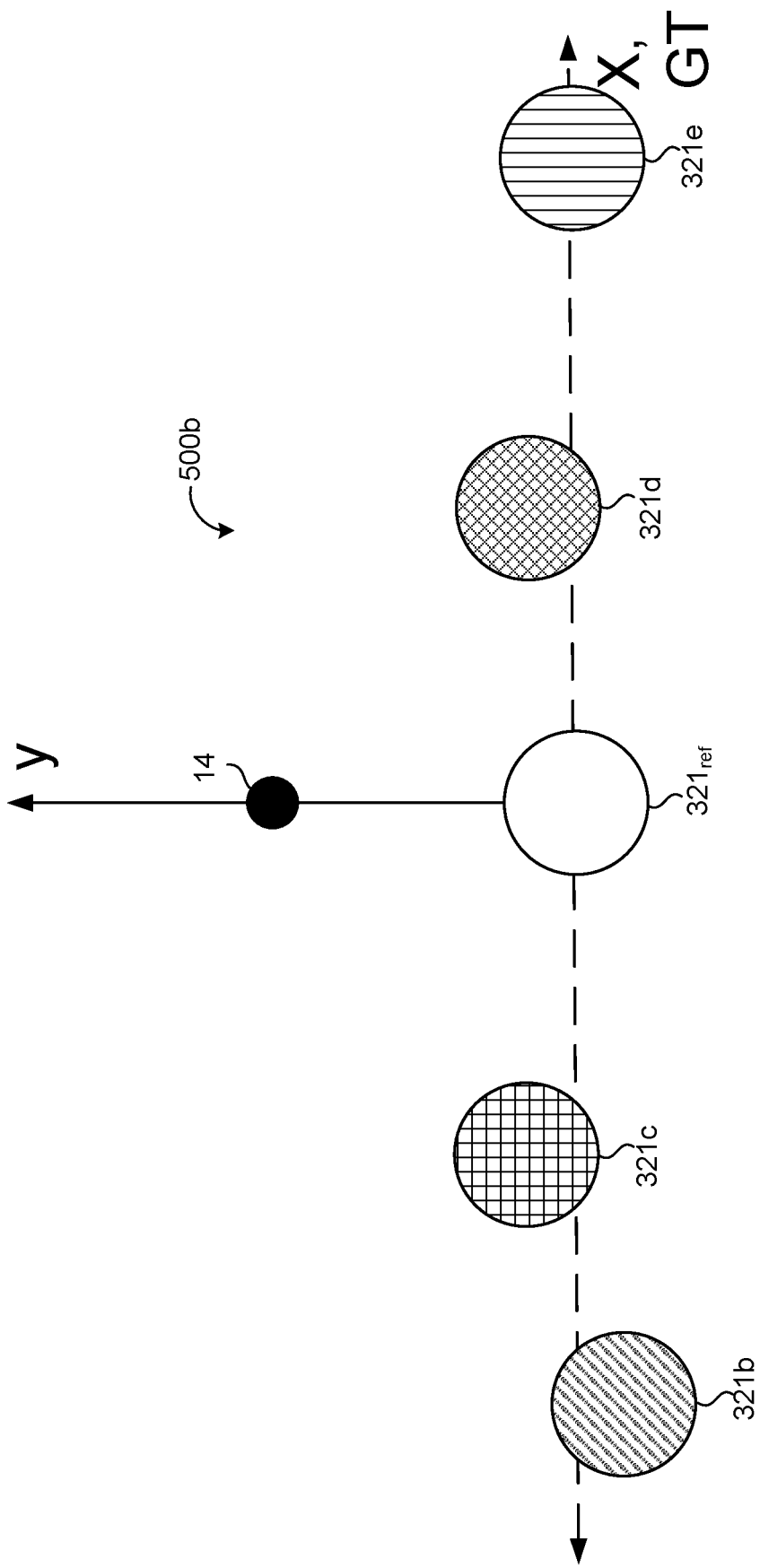
FIG. 5B is a plot showing localizations based on the sensor location data of FIG. 5A represented with respect to the ground truth trajectory.

An example of the practical results of step 320 is represented in schematic views 500a, 500b of FIGS. 5A and 5B. FIG. 5A shows representations of the sensor location data members $313_{ref}$, 313b-313e as respective locations of the robot 10 relative to a common reference feature 14 within the environment 10. When a map 182 is not available and/or image data 134 is poor, the robot 100 may move based on the assumption that movements of the robot 100 are consistent along the ground truth trajectory GT. Accordingly, in FIG. 5A, movement of the robot 100 appears consistent along a ground truth trajectory GT (e.g., the X-axis), while the location of the reference feature 14 is represented as being variable relative to the respective sensor location data members $313_{ref}$, 313b-313e. For clarity, the relative location of the reference feature 14, 14ref, 14b-14e corresponding to each sensor location data member $313_{ref}$, 313b-313e is labeled with a corresponding suffix (e.g., reference feature 14b represents the location of the reference feature 14b relative to the sensor position data members 313b). However, in reality, the represented locations of the reference feature 14ref, 14b-14e shown in FIG. 5A all correspond to the same reference feature 14, which has a fixed location relative to the environment 10 (e.g., a building column or wall).

At step 320, the localization process 310 performs the pairwise analysis to match the image data 134 (e.g., the reference feature 14) for each comparison sensor location data member 313b-313e to the image data $134_f$ of the reference sensor location data member $313_{ref}$. In other words, the localization process 310 matches observed locations 14b-14e of the reference feature 14 for the comparison sensor location data members 313b-313e to the observed location $14_{ref}$ of the reference feature 14 for the reference sensor location data member $313_{ref}$. FIG. 5B shows resulting localizations $321_{ref}$, 321b-321e based on performing the pairwise analysis on the comparison sensor location data members 313b-313c and the reference sensor location data member $313_{ref}$. As shown, the reference localization $321_{ref}$ is fixed at the origin and the comparison localizations 321b-321e are shifted relative to the reference localization $321_{ref}$. After performing the localization algorithm, the comparison localizations 321b-321e are inconsistently arranged along the ground truth trajectory GT, while the reference feature 14 is shown at a common location.

Figure 6A:
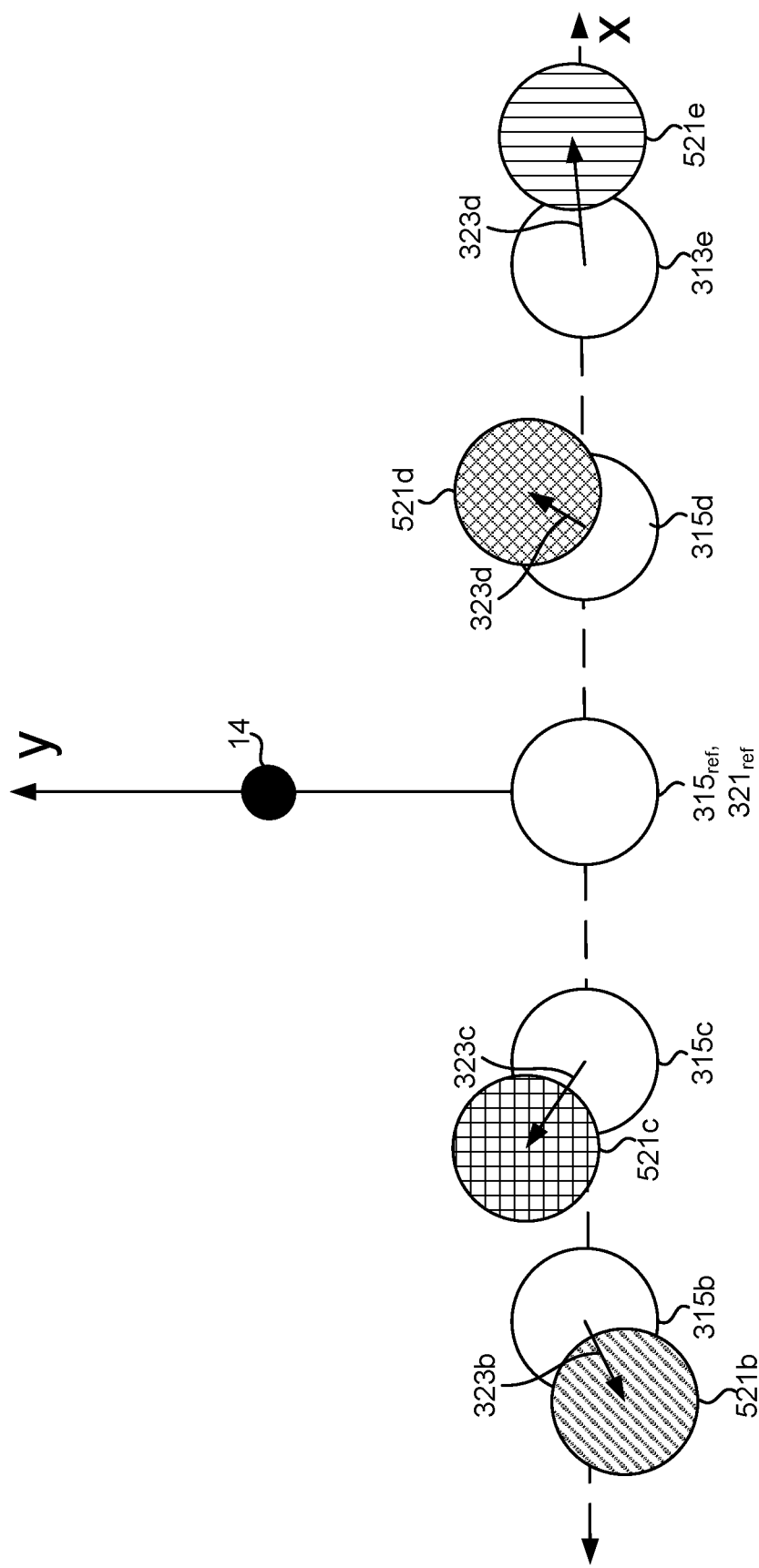
FIG. 6A is a plot showing offsets of the localizations of FIG. 5B relative to corresponding odometry location information.
Figure 6B:
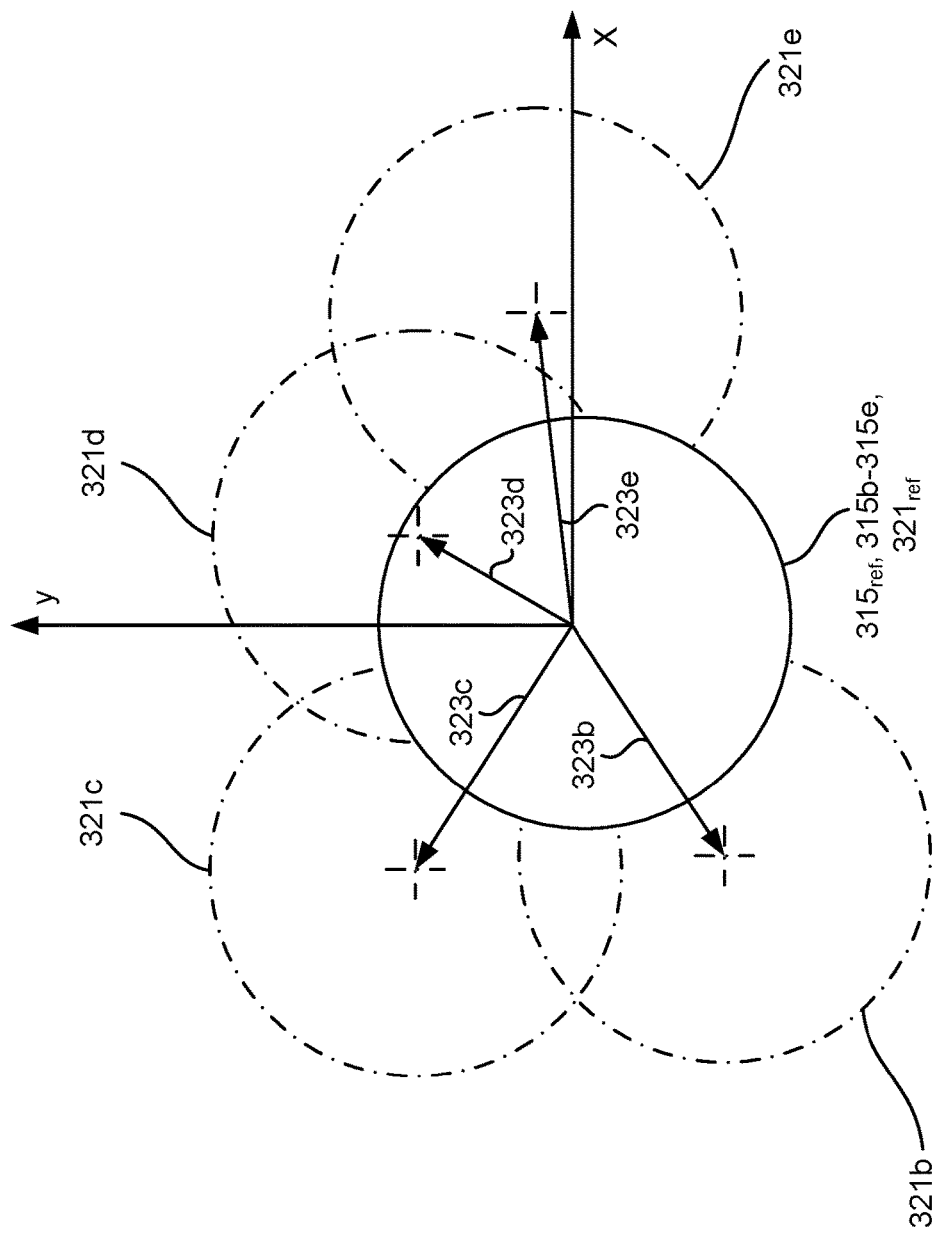
FIG. 6B is a plot showing offsets of the localizations of FIG. 5B relative to an origin.

Described with respect to FIGS. 6A and 6B, at step 322, the localization process 310 determines offsets between the localizations 321b-321e and the sample 319 of the odometry location information members 315b-315e associated with the sample basin 410. As discussed above, the noise associated with drift in the odometry location information sample 319 is negligible within the sample basin 410, such that the localization process 310 assumes that the comparison odometry location information members 315b-315e are accurate relative to the reference odometry location information member $315_{ref}$ which is set as the origin in FIG. 6A. In other words, while the odometry location information members 315b-315e may not be accurate with respect to the ground truth, the localization process 310 assumes that any errors in the odometry location information members 315b-315e are relatively small and consistent within the sample basin 410. The localization process 310 sets the reference localization $321_{ref}$ at the origin (i.e., aligned with the reference odometry location information member $315_{ref}$) and then determines the respective offsets 323b-323e between the comparison localizations 321b-321e and corresponding odometry location information members 315b-315e.

FIG. 6B shows the respective offsets 323b-323e of the comparison localizations 321b-321e relative to the corresponding odometry location information members 315b-315e, which are assumed to be accurate relative to the reference odometry location information member 315$_{ref}$ and are set at the origin. As shown, the comparison localizations 321b-321e are inconsistently offset by different magnitudes and in different directions from the corresponding odometry location information members 315b-315e. Generally, the inconsistent offsets 323b-323e indicate that the underlying image data 134$_I$ associated with the sensor location data 313 and the localizations 321 may be unreliable, as discussed below.

At step 324, the localization process 310 calculates a sample variance $s^2_{offset}$ of the offsets 323b-323e. As shown in FIG. 7A, values of the offsets 323b-323e are plotted as positive and negative values representing a difference in the position of a respective localization 321b-321e from the corresponding odometry location information members 315b-315e. FIG. 7A shows a relatively wide distribution with respect to the difference from the odometry location information members 315b-315e, which ultimately corresponds to a relatively large variance (step 326) and unreliable image data 134$_I$. For comparison, FIG. 7B shows an representation of example offsets 323$_{n-n+3}$ having a relatively narrow distribution with respect to the difference in odometry. In the example of FIG. 7B, the offsets 323$_{n-n+3}$ are tightly grouped along the negative direction. Consistent offsets in one direction, or tight grouping of the offsets 323 is more likely to represent an underlying sensor error (e.g., out of calibration) than unreliable sensor data 134. Thus, determining the sample variance $s^2_{offset}$ of the offsets 323b-323e is an effective way to determine whether inaccurate sensor data 134 is caused by the environment 10 (FIG. 7A) or the robot 100 (FIG. 7B).

At step 326, the localization process determines whether the sample variance $s^2_{offset}$ of the offsets 323b-323e exceeds a threshold sample variance $s^2_{threshold}$. The threshold sample variance $s^2_{threshold}$ may be a tuned value selected by the operator depending on a desired sensitivity of the localization process 310. For instance, a lower threshold variance $s^2_{threshold}$ may be selected where the operator wants the localization process 310 to be more sensitive (e.g., less trusting) to inconsistent image data 134$_I$ and a higher threshold variance $s^2_{threshold}$ may be selected where the operator wants the localization process to be less sensitive (e.g., more trusting) to inconsistent image data 134$_I$.

When the localization process 310 determines that the sample variance $s^2_{offset}$ of the offsets 323b-323e exceeds the threshold variance $s^2_{threshold}$ (e.g., FIG. 7A) (i.e., step 326 is "Yes"), the localization process 310 proceeds to step 328 and generates instructions 329 to reduce the weight of the sensor data 134 (e.g., image data) relative to the odometry information 192 when determining the current location data 202 of the robot 100 (step 334). Conversely, when the localization process 310 determines that the sample variance $s^2_{offset}$ of the offsets 323b-323e does not the threshold variance $s^2_{threshold}$ (e.g., FIG. 7B) (i.e., step 326 is "No"), the localization process 310 proceeds to step 330 and generates instructions 331 to maintain or increase the weight of the sensor data 134 (e.g., image data 1340 relative to the odometry information 192 when determining the current location data 202 of the robot (step 334).

The instructions 329, 331 may include weight values or adjustments corresponding the magnitude of the sample variance $s^2_{offset}$ of the offsets 323b-323e. Particularly, the weight values or adjustments may be proportional to the difference between the sample variance $s^2_{offset}$ of the offsets 323b-323e and the threshold variance $s^2_{threshold}$. For example, when the sample variance $s^2_{offset}$ of the offsets 323b-323e exceeds the threshold variance $s^2_{threshold}$ by a relatively large magnitude, the localization process 310 assigns a greater weight to the odometry information 192 than when the sample variance $s^2_{offset}$ of the offsets 323b-323e exceeds the threshold variance $s^2_{threshold}$ by a lesser magnitude. Similar principles are applied to increasing the weight of the sensor data 134 (step 330).

Optionally, when the localization process 310 determines that the sample variance $s^2_{offset}$ of the offsets 323b-323e exceeds the threshold variance $s^2_{threshold}$ at step 326 (i.e., the response at step 226 is "Yes"), the localization process 310 generates a notification 204 or report 333 indicating that the sensor data 134 corresponding to the region of the environment 10 associated with the sample basin 410 is unreliable. The sensor data report 333 can be used by an operator to determine regions of the environment 10 where additional and/or better reference features 14 are needed for the image data 134$_I$ to be improved.

At step 334, the localization process 310 determines the current location data 202 of the robot 100 by performing a localization algorithm based on the instructions 329, 331. The localization module 200 provides the current location data 202 to the control system 170, which uses the current location data 202 to determine future movements within the environment 10. The current location data 202 may also be used in a subsequent iteration 310$_{i+1}$ of the localization process 310.

The localization process 310 can be executed by the localization module 200 while the robot 100 is online, which allows the localization module 200 to determine regions of the environment 10 where the sensor data 134 is unreliable before the environment is fully mapped by the perception system 180. Additionally, the localization process 310 is model-free, such that localization module 200 does not need to know the localization algorithm or sensor properties to determine whether the image data 134$_I$ is reliable.

Figure 8:
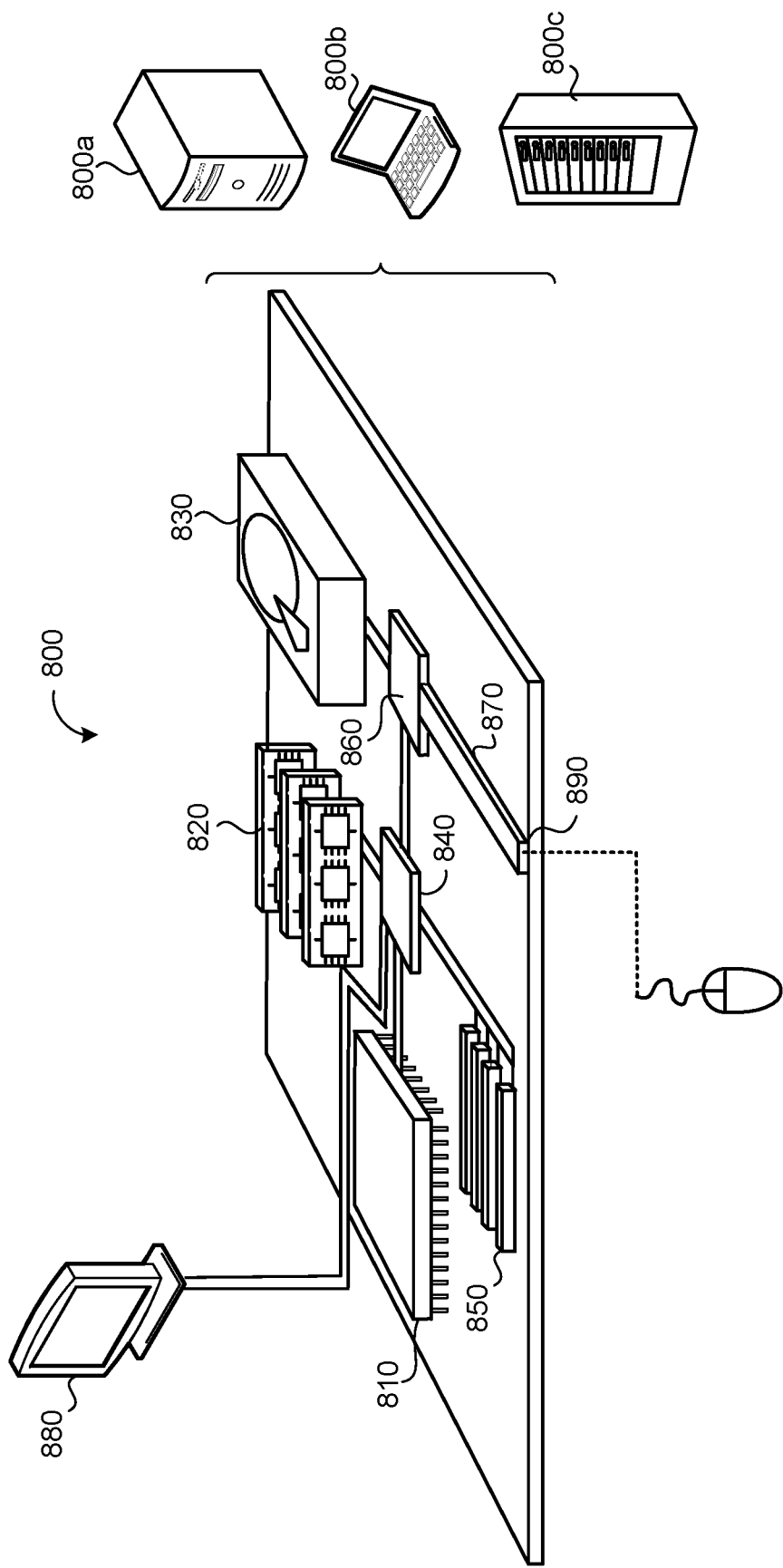
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810 (e.g., data processing hardware 502), memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 (e.g. memory hardware 504) stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 (e.g., memory hardware 504) is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described herein can be realized in digital electronic and/or optical circuitry, integrated circuitry, specially designed ASICs (application specific integrated circuits), computer hardware, firmware, software, and/or combinations thereof.

These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    while a robot traverses an environment:
        receiving, at data processing hardware, odometry information plotting a location of the robot over time; and
        receiving, at the data processing hardware, from at least one sensor of the robot in communication with the data processing hardware, sensor data of the environment about the robot;
    obtaining, by the data processing hardware, an odometry information sample including a series of odometry information members collected by the robot while traversing the environment, each odometry information member of the series of odometry information members comprising a respective odometry measurement at a respective time;
    obtaining, by the data processing hardware, a sensor data sample including a series of sensor data members collected by the robot while traversing the environment, each sensor data member of the series of sensor data members comprising a respective sensor measurement at the respective time;
    for each sensor data member of the series of sensor data members:
        determining, by the data processing hardware, a localization of the robot at the respective time based on the respective sensor data; and
        determining, by the data processing hardware, an offset of the localization of the robot relative to the odometry measurement at the respective time;
        determining, by the data processing hardware, whether a variance of the offsets determined for the localizations exceeds a threshold variance; and
        when the variance among the offsets exceeds the threshold variance, generating, by the data processing hardware, a signal indicating that the sensor data is unreliable; and
    adjusting, by the data processing hardware, relative weights of the odometry information and the sensor data based on whether the offsets determined for the localizations exceed the threshold variance.

2. The method of claim 1, further comprising determining by the data processing hardware, a current location of the robot using the adjusted relative weights of the odometry information and the sensor data.

3. The method of claim 1, further comprising, when the variance of the offsets exceeds the threshold variance, reducing, by the data processing hardware, a weight of the sensor data relative.

4. The method of claim 1, further comprising, when the variance of the offsets does not exceed the threshold variance, increasing, by the data processing hardware, weight assigned to the sensor data.

5. The method of claim 1, wherein the series of sensor data members includes a reference sensor data member and a plurality of comparison sensor data members.

6. The method of claim 5, wherein determining the localization includes performing a pairwise analysis on one of the comparison sensor data members associated with the respective time with the reference sensor data member.

7. A method comprising:
    while a robot traverses an environment:
        receiving, at data processing hardware, odometry information plotting a location of the robot over time; and
        receiving, at the data processing hardware, from at least one sensor of the robot in communication with the data processing hardware, sensor data of the environment about the robot;
    obtaining, by the data processing hardware, an odometry information sample including a series of odometry information members collected by the robot while traversing the environment, each odometry information member of the series of odometry information members comprising a respective odometry measurement at a respective time;
    obtaining, by the data processing hardware, a sensor data sample including a series of sensor data members collected by the robot while traversing the environment, each sensor data member of the series of sensor data members comprising a respective sensor measurement at the respective time;
    for each sensor data member of the series of sensor data members:
        determining, by the data processing hardware, a localization of the robot at the respective time based on the respective sensor data; and
        determining, by the data processing hardware, an offset of the localization of the robot relative to the odometry measurement at the respective time;
        determining, by the data processing hardware, whether a variance of the offsets determined for the localizations exceeds a threshold variance; and
    when the variance among the offsets exceeds the threshold variance, generating, by the data processing hardware, a signal indicating that the sensor data is unreliable, wherein the variance of the offsets is a sample variance.

8. The method of claim 7, wherein the series of sensor data members includes a reference sensor data member and a plurality of comparison sensor data members.

9. A system comprising:
    data processing hardware; and
    memory hardware in communication with the data processing hardware, the memory hardware storing instructions that when executed on the data processing hardware cause the data processing hardware to perform operations comprising:
        while a robot traverses an environment:
        receiving odometry information plotting a location of the robot over time; and
        receiving from at least one sensor of the robot in communication with the data processing hardware, sensor data of the environment about the robot;
        obtaining an odometry information sample including a series of odometry information members collected by the robot while traversing the environment, each odometry information member of the series of odometry information members comprising a respective odometry measurement at a respective time;
        obtaining a sensor data sample including a series of sensor data members collected by the robot while traversing the environment, each sensor data member of the series of sensor data members comprising a respective sensor measurement at the respective time;

for each sensor data member of the series of sensor data members:
  determining a localization of the robot at the respective time based on the respective sensor data; and
  determining an offset of the localization of the robot relative to the odometry measurement at the respective time;
  determining whether a variance of the offsets determined for the localizations exceeds a threshold variance; and
  when the variance among the offsets exceeds the threshold variance, generating, by the data processing hardware, a signal indicating that the sensor data is unreliable, wherein the variance of the offsets is a sample variance.

10. The system of claim 9, wherein the operations further comprise adjusting, by the data processing hardware, relative weights of the odometry information and the sensor data based on whether the offsets determined for the localizations exceed the threshold variance.

11. The system of claim 10, wherein the operations further comprise determining a current location of the robot using the adjusted relative weights of the odometry information and the sensor data.

12. The system of claim 9, wherein the operations further comprise, when the variance of the offsets exceeds the threshold variance, reducing a weight of the sensor data relative.

13. The system of claim 9, wherein the operations further comprise, when the variance of the offsets does not exceed the threshold variance, increasing weight assigned to the sensor data.

14. The system of claim 9, wherein the series of sensor data members includes a reference sensor data member and a plurality of comparison sensor data members.

15. The system of claim 14, wherein determining the localization includes performing a pairwise analysis on one of the comparison sensor data members associated with the respective time with the reference sensor data member.

16. A robot comprising:
  a body;
  data processing hardware; and
  memory hardware in communication with the data processing hardware, the memory hardware storing instructions that when executed on the data processing hardware cause the data processing hardware to perform operations comprising:
  while a robot traverses an environment:
    receiving odometry information plotting a location of the robot over time; and
    receiving from at least one sensor of the robot in communication with the data processing hardware, sensor data of the environment about the robot;
    obtaining an odometry information sample including a series of odometry information members collected by the robot while traversing the environment, each odometry information member of the series of odometry information members comprising a respective odometry measurement at a respective time;
    obtaining a sensor data sample including a series of sensor data members collected by the robot while traversing the environment, each sensor data member of the series of sensor data members comprising a respective sensor measurement at the respective time;
    for each sensor data member of the series of sensor data members:
      determining a localization of the robot at the respective time based on the respective sensor data; and
      determining an offset of the localization of the robot relative to the odometry measurement at the respective time;
      determining whether a variance of the offsets determined for the localizations exceeds a threshold variance;
      when the variance among the offsets exceeds the threshold variance, generating, by the data processing hardware, a signal indicating that the sensor data is unreliable; and
    adjusting, by the data processing hardware, relative weights of the odometry information and the sensor data based on whether the offsets determined for the localizations exceed the threshold variance.

17. The robot of claim 16, wherein the operations further comprise determining a current location of the robot using the adjusted relative weights of the odometry information and the sensor data.

18. The robot of claim 16, wherein the operations further comprise, when the variance of the offsets exceeds the threshold variance, reducing a weight of the sensor data relative.

19. The robot of claim 16, wherein the operations further comprise, when the variance of the offsets does not exceed the threshold variance, increasing weight assigned to the sensor data.

20. The robot of claim 16, wherein the variance of the offsets is a sample variance.

21. A robot comprising:
  a body;
  data processing hardware; and
  memory hardware in communication with the data processing hardware, the memory hardware storing instructions that when executed on the data processing hardware cause the data processing hardware to perform operations comprising:
  while a robot traverses an environment:
    receiving odometry information plotting a location of the robot over time; and
    receiving from at least one sensor of the robot in communication with the data processing hardware, sensor data of the environment about the robot;
    obtaining an odometry information sample including a series of odometry information members collected by the robot while traversing the environment, each odometry information member of the series of odometry information members comprising a respective odometry measurement at a respective time;
    obtaining a sensor data sample including a series of sensor data members collected by the robot while traversing the environment, each sensor data member of the series of sensor data members comprising a respective sensor measurement at the respective time;
    for each sensor data member of the series of sensor data members:
      determining a localization of the robot at the respective time based on the respective sensor data; and
      determining an offset of the localization of the robot relative to the odometry measurement at the respective time;
      determining whether a variance of the offsets determined for the localizations exceeds a threshold variance; and when the variance among the offsets exceeds the threshold variance, generating, by the data processing hardware, a signal indicating that the sensor data is unreliable, wherein the series of sensor data members includes a reference sensor data member and a plurality of comparison sensor data members.

22. The robot of claim 21, wherein determining the localization includes performing a pairwise analysis on one of the comparison sensor data members associated with the respective time with the reference sensor data member.

23. The robot of claim 21, wherein the operations further comprise, when the variance of the offsets does not exceed the threshold variance, increasing weight assigned to the sensor data.

24. The robot of claim 21, wherein the variance of the offsets is a sample variance.

* * * * *